(12) United States Patent
Seko et al.

(10) Patent No.: US 7,335,623 B2
(45) Date of Patent: Feb. 26, 2008

(54) METHOD OF SYNTHESIZING ZIRCONIUM-LOADED FIBROUS ADSORBENT MATERIALS HAVING PHOSPHORYL GROUPS AND REMOVAL OF OBJECTIONABLE SUBSTANCES USING THE ADSORBENTS

(75) Inventors: Noriaki Seko, Gunma (JP); Masao Tamada, Gunma (JP)

(73) Assignee: Japan Atomic Energy Agency, Kashiwa (JP)

( * ) Notice: Subject to any disclaimer, the term of this patent is extended or adjusted under 35 U.S.C. 154(b) by 556 days.

(21) Appl. No.: 10/732,232

(22) Filed: Dec. 11, 2003

(65) Prior Publication Data

US 2004/0121676 A1   Jun. 24, 2004

(30) Foreign Application Priority Data

Dec. 11, 2002   (JP) ............................. 2002-358915

(51) Int. Cl.
*B01J 20/22* (2006.01)
*B01J 20/26* (2006.01)
*C02F 1/58* (2006.01)

(52) U.S. Cl. ........................ 502/401; 210/683; 502/402

(58) Field of Classification Search ................. 423/87; 210/683, 684, 685, 688; 502/400, 401, 402
See application file for complete search history.

(56) References Cited

OTHER PUBLICATIONS

Xiaoping Zhu et al., "Removal of Arsenic(V) by Zirconium(IV)-Loaded Phosphoric Acid Chelating Resin", 2001, Marcel Dekkar, Inc., 36(14), 3175-3189.*

* cited by examiner

*Primary Examiner*—Wayne A. Langel
*Assistant Examiner*—James Fiorito
(74) *Attorney, Agent, or Firm*—Staas & Halsey LLP

(57) ABSTRACT

A zirconium-loaded fibrous adsorbent material having phosphoryl groups which is produced by first grafting a reactive monomer having phosphoryl groups onto a polymeric substrate and then loading zirconium.

7 Claims, 5 Drawing Sheets

METHOD OF SYNTHESIZING ZIRCONIUM-LOADED FIBROUS ADSORBENT MATERIALS HAVING PHOSPHORYL GROUPS AND REMOVAL OF OBJECTIONABLE SUBSTANCES USING THE ADSORBENTS

This application is based upon and claims the benefit of priority from Japanese Patent Application No. 2002-358915 filed Dec. 11, 2002, the entire contents of this application are incorporated herein by reference.

BACKGROUND OF THE INVENTION

This invention relates to an adsorbent material for recovering and removing objectionable substances, in particular, arsenic that are contained in environmental water and liquid wastes such as waste water from plants. The invention also relates to a method of synthesizing the adsorbent material.

Research and development efforts have recently been made on materials capable of trapping metals contained in environmental water bodies such as rivers and the sea and this has led to the discovery that cation exchange resins using phosphoric acid as exchange groups can adsorb metal ions present in rivers, lakes and wastewater from plants (see, for example, Akinori Joh et al., "Cation exchange resins using phosphoric acid as exchange groups—Their selectivity for metal ions and applications" in PHOSPHORUS LETTER, Japanese Association of Inorganic Phosphorus Chemistry, Feb. 1, 2001, vol. 40, pp. 16-21).

Further, the present inventors developed a metal adsorbent material that had a monomer with phosphoryl groups grafted onto a polymeric substrate (see, for example, Japanese Patent Application No. 2002-262502).

In the art of recovering and removing objectionable substances in the environment, particularly arsenic, two major methods have so far been practiced, one relying upon coagulating sedimentation and the other using chelating resins (see, for example, Xiaoping Zhu et al., "Removal of arsenic(V) by zirconium(IV)-loaded phosphoric acid chelating resin" in "SEPARATION SCIENCE AND TECHNOLOGY", America, Marcel Dekker, Inc., 2001, 36(14), pp. 3175-3189).

However, the conventional adsorbent materials can adsorb arsenic only slowly. If arsenic is recovered and removed by coagulating sedimentation or with the aid of adsorbent materials in bead form, considerable inconvenience in handling has been met during the process of removal or in subsequent operations.

In addition, the conventional arsenic adsorbent materials are mostly synthesized by common radical polymerization and their structure for adsorption of arsenic is so unstable that it is prone to leak out even if it is adsorbed.

According to the Basic Environment Law which provides for the water quality guidelines for public waters, arsenic should not be discharged at concentrations higher than 0.1 ppm and its content in the environment should not exceed 0.01 ppm. Thus, the removal of arsenic is absolutely necessary.

SUMMARY OF THE INVENTION

An object, therefore, of the present invention is to provide an adsorbent material that allows for faster adsorption of arsenic and anion such as phosphoric ion and which can remove them even if they are present at extremely low concentrations.

Another object of the invention is to provide an adsorbent material that is easy to handle during or after adsorptive removal of arsenic and which is capable of efficient adsorption of arsenic.

In order to attain those objects, the present inventors made intensive studies and completed the present invention which relates to a zirconium-loaded fibrous adsorbent material having phosphoryl groups.

The zirconium-loaded fibrous adsorbent material of the invention having phosphoryl groups is produced by first grafting a reactive monomer having phosphoryl groups onto a polymeric substrate and then loading zirconium.

DETAILED DESCRIPTION OF THE INVENTION

Figure 1:
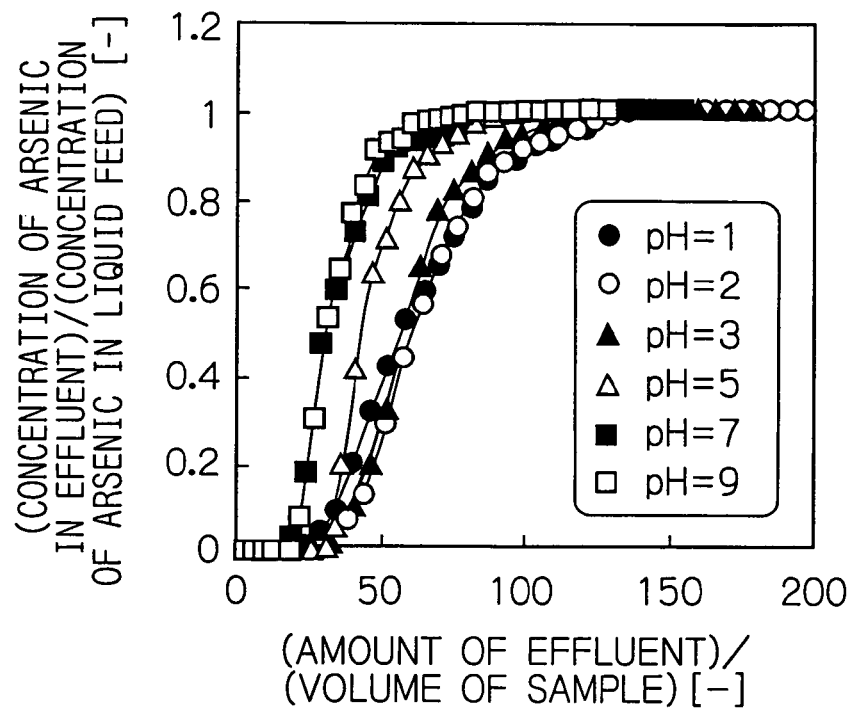
FIG. 1 is a graph showing the pH dependency of the performance of the zirconium-loaded adsorbent material of the invention in adsorbing arsenic.

The adsorbent material of the invention is a zirconium-loaded fibrous adsorbent material having phosphoryl groups and it is produced by first grafting a reactive monomer having phosphoryl groups onto a polymeric substrate and then loading zirconium.

In the invention, fibers of polypropylene, polyethylene, polyester or composites thereof can be used as the polymeric substrate and they may take on various forms including short fiber, filament, nonwoven fabric or woven fabric.

The first step in the synthesis of the adsorbent material of the invention is preparing an adsorbent precursor (hereunder sometimes referred to as the "graft product") by grafting a reactive monomer having phosphoryl groups onto the polymeric substrate.

1. Preparing the Adsorbent Precursor (Graft Product)

The method for preparing the graft product may comply with the conditions for synthesis disclosed in Japanese Patent Application No. 2002-262502. Specific procedures and conditions of the method are described below.

A monomer having mono- or difunctional phosphoryl groups may be introduced into the polymeric substrate and specific examples include:

mono(2-methacryloyloxyethyl)acid phosphate $CH_2=C(CH_3)COO(CH_2)_2OPO(OH)_2$;

di(2-methacryloyloxyethyl)acid phosphate $[CH_2=C(CH_3)COO(CH_2)_2O]_2PO(OH)$;

mono(2-acryloyloxyethyl)acid phosphate $CH_2=CHCOO(CH_2)_2OPO(OH)_2$;

di(2-acryloyloxyethyl)acid phosphate $[CH_2=CHCOO(CH_2)_2O]_2PO(OH)$; and mixed monomers thereof.

In the case of using mixed monomers, the mixing ratios of the respective monomers may be changed appropriately.

A type of monomer having the following structure may also be used as the reactive monomer:

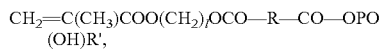

wherein R is an optionally substituted $(CH_2)_m$ or $C_6H_4$; R' is a hydroxyl group or $CH_2=C(CH_3)COO(CH_2)_nOCO—R—CO—O—$ group; l, m and n are each independently an integer of 1-6.

Graft polymerization can be effected by first generating reaction active points in the polymeric substrate and then bringing it into contact with the reactive monomer.

Reaction active points can be generated by either one of the following methods (a)-(c).

(a) Exposure to Radiation

The polymeric substrate as preliminarily nitrogen purged is exposed to radiation in a nitrogen atmosphere either at room temperature or under cooling with Dry Ice. The radiation to be employed is electron beams or γ-rays. The exposure dose may be determined appropriately on the condition that it be sufficient to generate reaction active points and it is typically in the range of 50-200 kGy.

(b) Exposure to Plasma

The polymeric substrate as preliminarily nitrogen purged is exposed to plasma in a nitrogen atmosphere at room temperature. The exposure continues for 1-24 hours using rf waves at 10 MHz or higher.

(c) Use of Initiator

Under nitrogen bubbling, reaction active points are generated using a radical initiator at between room temperature and 50° C. Exemplary radical initiators include azobisisobutyronitrile and benzoyl peroxide.

While graft polymerization can be effected in a nitrogen atmosphere, the concentration of oxygen in the atmosphere is preferably low in order to achieve higher values of percent grafting. The term "percent grafting" as used herein means the ratio in weight percentage of the reactive monomer to the polymeric substrate onto which it has been grafted. The reaction temperature which depends on the reactivity of the reactive monomer is generally between 40 and 60° C. The concentration of the monomer suffices to range from 10 to 30% of the solvent. The reaction time which is generally 1-48 hours can be determined depending upon the reaction temperature and the percent grafting required.

2. Synthesis of the Zirconium-Loaded Adsorbent Material

The adsorbent material of the invention can be produced by loading the thus prepared graft product with zirconium.

The graft product is subjected to passage of a zirconium compound in solution at a pH of 0.5-2 for 1-24 hours at a flow rate of 100 mL/h. The zirconium compound that can be used in the invention is a zirconium(IV) compound, a zirconium(III) compound or a zirconium(II) compound and may be exemplified by zirconic acid, zirconate (a conventional oxo-acid salt of zirconium(IV)), zirconate (which is not an oxo-acid of zirconium), etc. Specific examples of zirconium compounds in solution include solutions of zirconium nitrate, zirconium sulfate, zirconium chloride and zirconium oxide, as well as an analytical standard solution of zirconium. The concentration of zirconium compounds in solution can be adjusted appropriately.

In order to subject the graft product to passage of zirconium compounds in solution, any means known to the skilled artisan may be employed, such as stirring the solution in which the graft product is immersed or passing the solution through a column packed with the graft product. Preferably, the desired product can be obtained by stirring 10 mmol/L of zirconium nitrate in solution at a pH of 1 for one hour as it contains the graft product immersed therein or by passing the solution through a column packed with the graft product.

Figure 2:
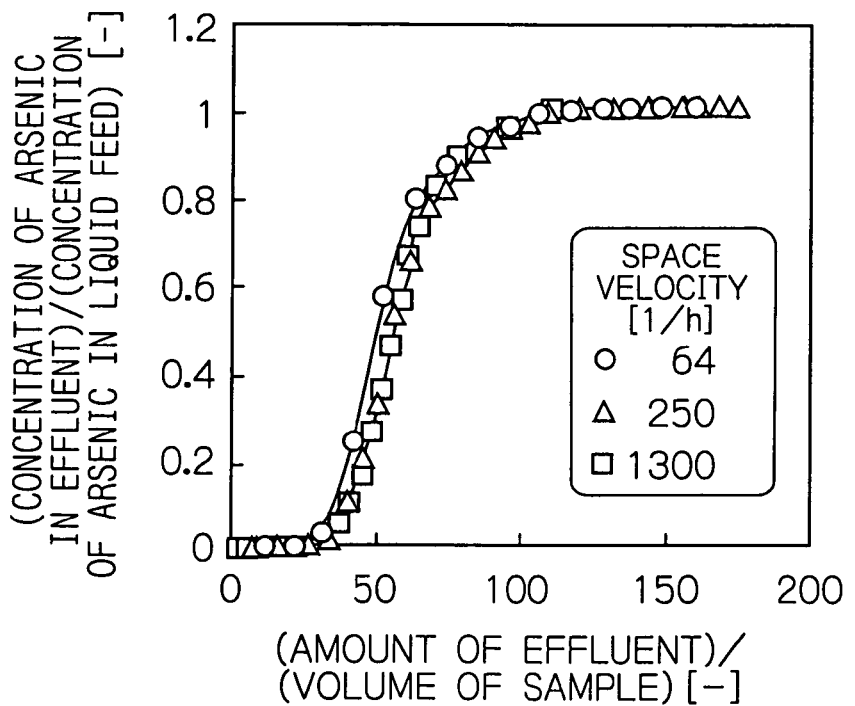
FIG. 2 is a graph showing the dependency on flow rate of arsenic adsorption by the zirconium-loaded adsorbent material of the invention.
Figure 3:
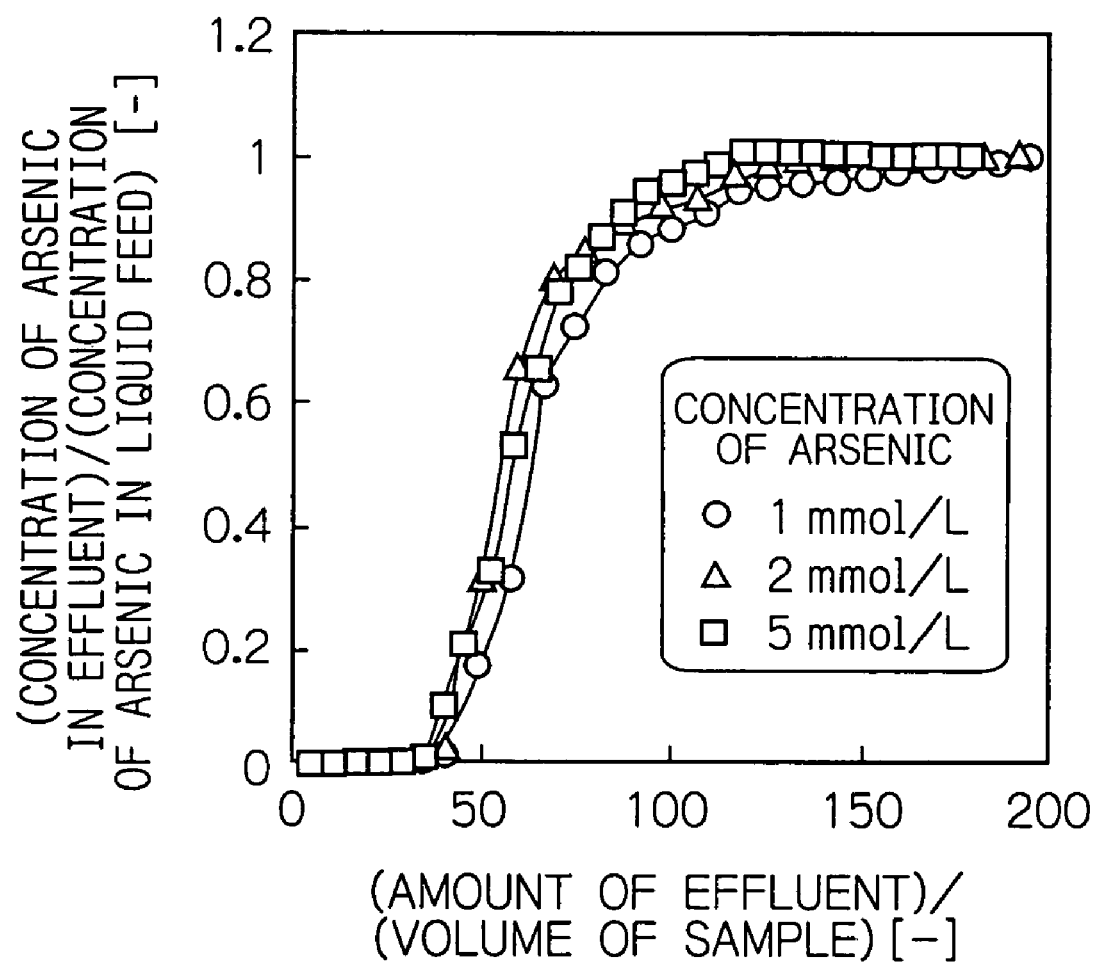
FIG. 3 is a graph showing the dependency on arsenic's concentration of the zirconium-loaded adsorbent material of the invention.

The arsenic adsorption characteristics of the adsorbent material of the invention are depicted in FIGS. 1-3.

FIG. 1 is a graph showing the pH dependency of arsenic adsorption at varying pHs of an arsenic containing liquor. As one can see from FIG. 1, the adsorbent material of the invention can adsorb arsenic at pHs of 1-9 and its adsorbing capability is by no means dependent on pH. It can also be seen that the difference in absorbing capability is particularly small in the acidic range below pH=7. At each of the tested pH values, the absorbing capability of the adsorbent material saturated and substantially leveled off when the amount of the effluent was about 130 times the volume of the sample.

FIG. 2 is a graph showing the dependency on flow rate of arsenic adsorption at varying flow rates of an arsenic containing liquor. As one can see from FIG. 2, the adsorbing capability was maintained when the arsenic containing liquor was passed at space velocities of 64-1300 1/h and this indicates that arsenic could be adsorbed without leakage even at high treatment speeds. The data in FIG. 2 shows the feasibility of the adsorbent material of the invention in large-scale, high-speed treatments as in plants.

FIG. 3 is a graph showing the concentration dependency of arsenic adsorption at varying concentrations of arsenic in an arsenic containing liquor. As one can see from FIG. 3, the adsorbing capability of the adsorbent material of the invention does not vary much at arsenic concentrations of 1-5 mmol/L and can be maintained independent of the concentration of the treating liquor.

Thus, FIGS. 1-3 show that the adsorbent material of the invention exhibits high adsorbing capability independent of the concentration of the treating liquor, the pH and the treating speed.

The following examples are provided for further illustrating the present invention but are in no way to be taken as limiting.

EXAMPLE 1

A nonwoven fabric as a polymeric substrate was subjected to graft polymerization and the resulting graft product in nonwoven fabric form was rendered wet by passing pure water. In the process of preparing the graft product, the conversion (the degree of grafting) was 100-400% and phosphoryl groups were introduced in amounts of 4-8 mmol/g. Subsequently, the graft product was packed into an adsorption column, through which an aqueous solution of zirconium nitrate (10 mmol/L, pH=2) was passed for one hour at a flow rate of 100 mL/h so as to load the graft product with zirconium. Thereafter, the column was washed with pure water until the pH of the effluent was between 5 and 7, thereby yielding a zirconium-loaded adsorbent material. The zirconium loading was 4.2 mmol/g. The adsorbent material produced in Example 1 using the nonwoven fabric is not only usable as a filter on its own; the scope of its applications can be widened by processing it into various shapes or making a laminate of it.

EXAMPLE 2

Polyethylene short fiber was used as a polymeric substrate, onto which a reactive monomer having phosphoryl groups was grafted to prepare a graft product. The degree of grafting was 100-300% and phosphoryl groups were introduced in amounts of 1-8 mmol/g. An aqueous solution of zirconium preliminarily adjusted to 10 mmol/L was treated with nitric acid to have a pH of 1. The fibrous graft product was immersed in that acidic aqueous solution of zirconium, which was then stirred for 1-24 hours at 25° C. The zirconium-loaded adsorbent material was obtained and it was found to have zirconium introduced in an amount of 4.0 mmol/g.

The adsorbent material produced in Example 2 using the short fiber has good processability and can be packed into various types of modules including columns, thus expanding the scope of its applications.

The adsorbent material of the present invention is synthesized by utilizing graft polymerization, so a crosslinked structure can be easily formed within the adsorbent material. Since this facilitates immobilization of zirconium which is responsible for adsorbing arsenic, not only the arsenic contained in the environment such as natural water but also other objectionable substances including antimony and negatively charged ions such as fluoride and chloride ions can be easily removed, thus adding potential uses including prevention of environmental pollution and purification of potable water.

Unlike the conventional adsorbent materials that must be processed into modules for practical use, the adsorbent material of the invention can be directly used as a filter and permits easy handling.

EXAMPLE 3

Figure 4:
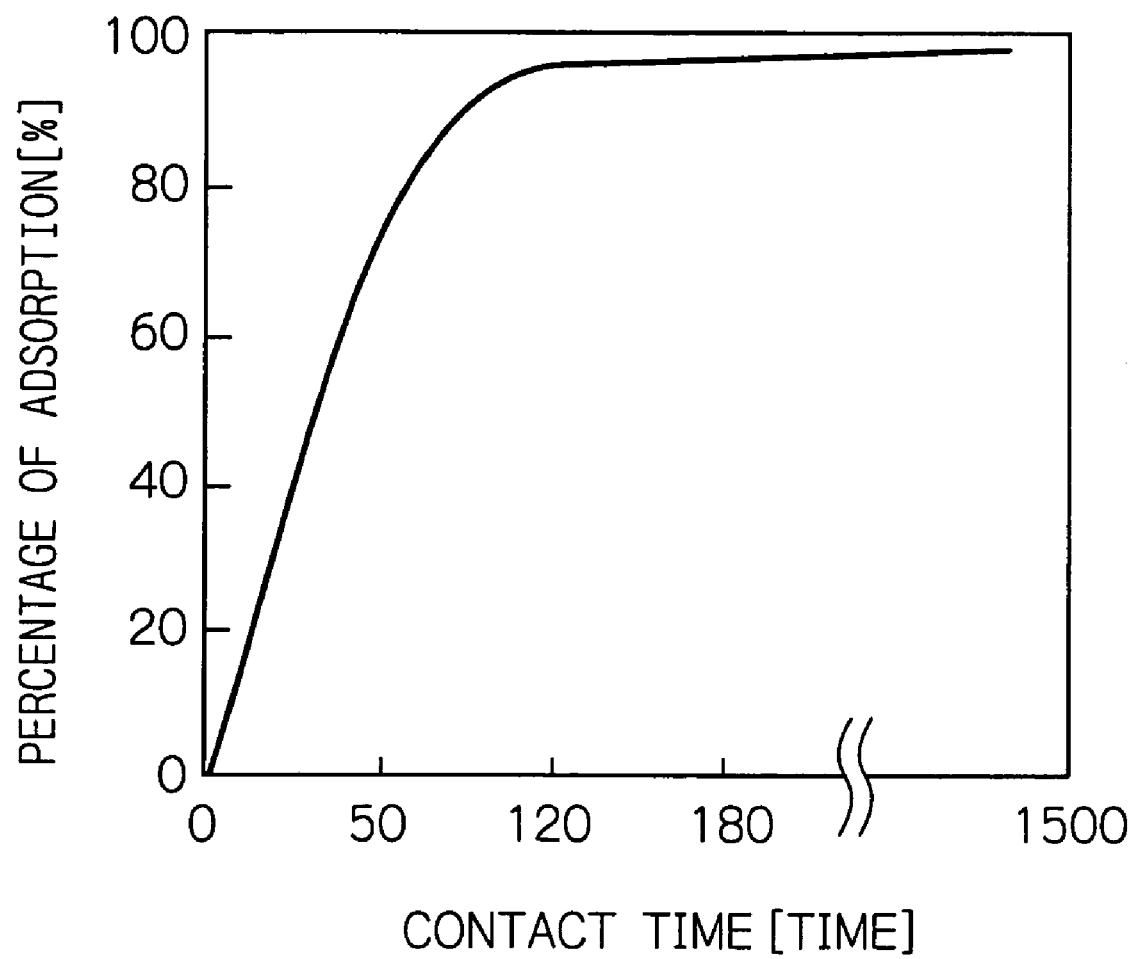
FIG. 4 is a graph showing the phosphoric ion adsorption characteristics of the adsorbent material of the invention.

The phosphoric ion adsorption characteristics of the adsorbent material of the invention are depicted in FIG. 4. It was depicted by subjecting the material to a passage of phosphoric ion containing liquors at a pH of 1.5 having various phosphoric ion concentrations at varying contact time. Compared with the prior method of adsorbing phosphoric ions by using a zirconium-loaded activated carbon, the rate of adsorption obtained by the adsorbent material of the invention is so high that the percentage of adsorption attained up to about 100% in 2 hours.

Figure 5:
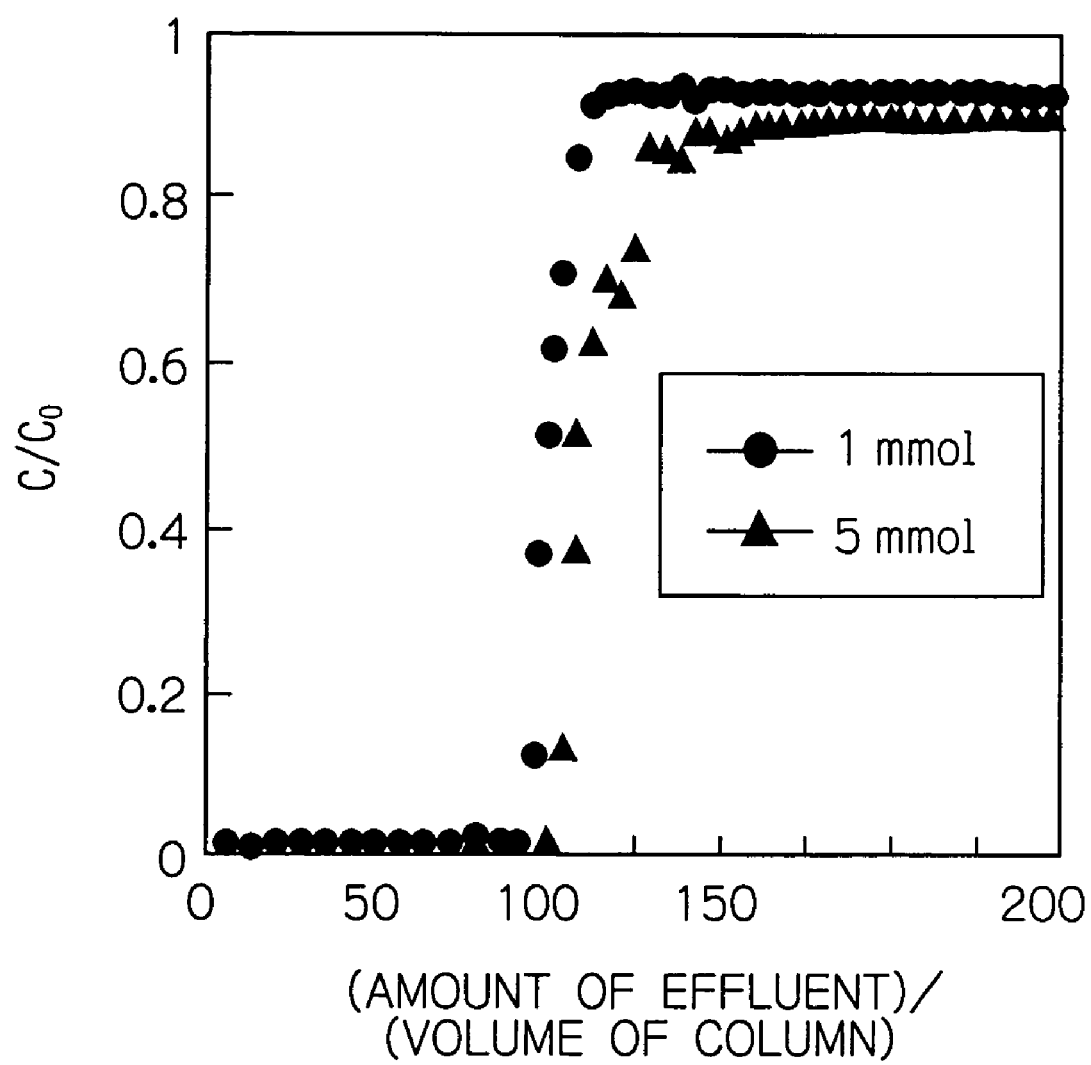
FIG. 5 is a breakthrough curve of phosphoric ion on the adsorbent material of the invention.

The breakthrough curve of phosphoric ion on the adsorbent material of the invention was depicted in FIG. 5. As shown in FIG. 5, when the adsorbent material of the invention was packed into a column, through which a phosphoric ion containing liquor was passed, no phosphoric ion was leaked independent of the phosphoric ion concentration in the liquor.

EXAMPLE 4

Figure 6:
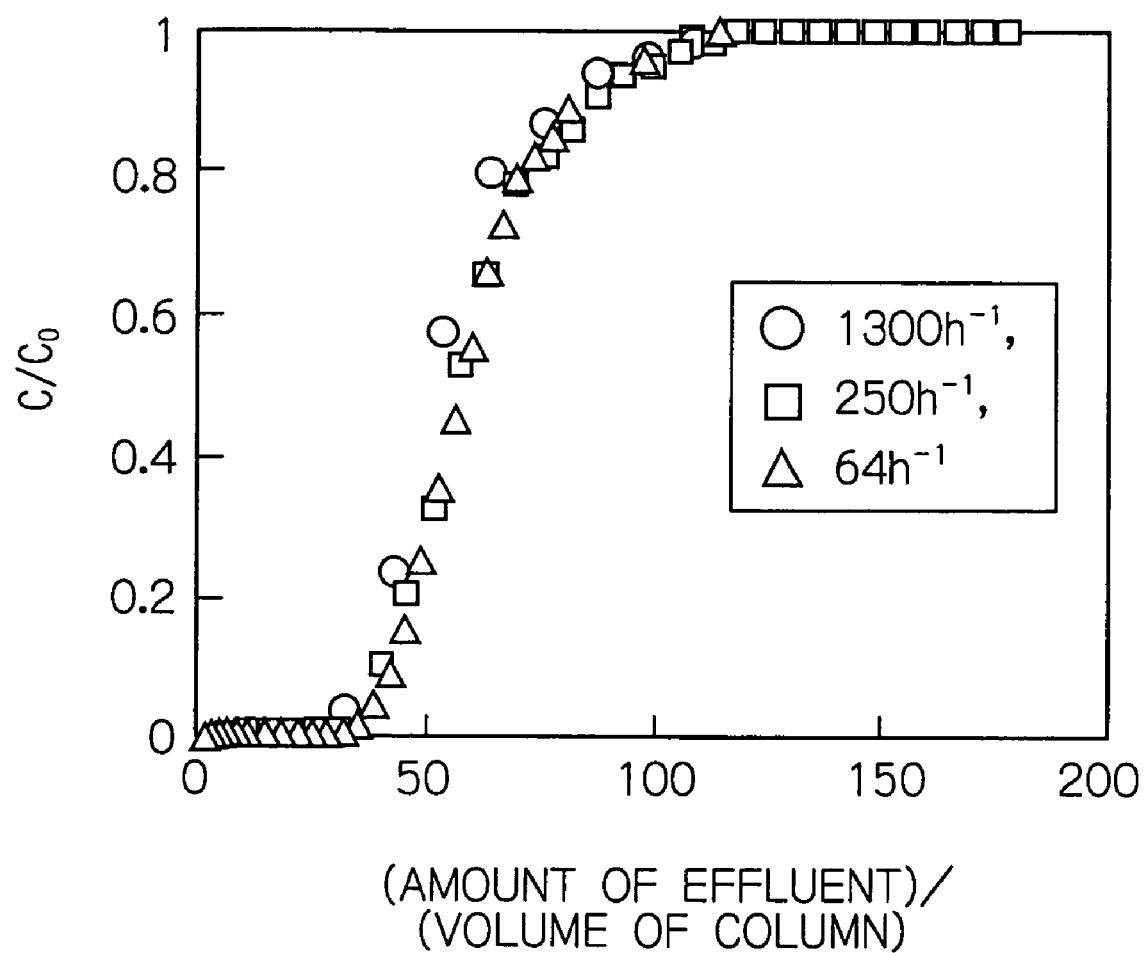
FIG. 6 is a breakthrough curve of fluoride ion on the adsorbent material of the invention.

Adsorption experiment was conducted on the adsorbent material of the invention by using a fluoride ion containing liquor. The liquor was prepared by adjusting pH of a standard solution of fluorine (10 mmol) to 7. The breakthrough curve of fluoride ion on the adsorbent material was depicted in FIG. 6. The adsorbent material of the invention was packed into a column, through which the liquor was passed at flow rate of 1300 $h^{-1}$, 240 $h^{-1}$, and 64 $h^{-1}$, in result, the breakthrough point was about 50 independent of the flow rate of the liquor.

What is claimed is:

1. A zirconium-loaded fibrous adsorbent material having phosphoryl groups which is produced by first grafting a reactive monomer having phosphoryl groups onto a polymeric substrate and then loading zirconium, wherein the zirconium-loaded fibrous adsorbent material has a zirconium content in an amount of 4.0 or 4.2 mmol/g.

2. The zirconium-loaded fibrous adsorbent material of claim 1, wherein the fibrous material is selected from the group consisting of a fiber, a filament, a nonwoven fabric or a woven fabric.

3. The zirconium-loaded fibrous adsorbent material of claim 2, wherein the fiber is a fiber of polypropylene, polyethylene or polyester.

4. The zirconium-loaded fibrous adsorbent material of claim 3, wherein the fiber is a fiber of polypropylene, or polyethylene.

5. The zirconium-loaded fibrous adsorbent material of claim 1, wherein the phosphoryl group is a member selected from the group consisting of mono(2-methacryloyloxyethyl) acid phosphate, di(2-methacryloyloxyethyl)acid phosphate, mono(2-acryloyloxyethyl)acid phosphate, di(2-acryloyloxyethyl)acid phosphate, and mixtures thereof.

6. The zirconium-loaded fibrous adsorbent material of claim 1, wherein the reactive monomer comprises a material of formula:

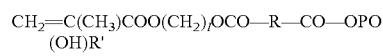

$$CH_2=C(CH_3)COO(CH_2)_lOCO-R-CO-OPO(OH)R'$$

wherein R is an optionally substituted $(CH_2)_m$ group or $C_6H_4$ group, wherein R' is a hydroxyl group or a $CH_2=C(CH_3)COO(CH_2)_nOCO-R-CO-O-$ group, wherein l, m and n are each independently an integer of 1-6.

7. The zirconium-loaded fibrous adsorbent material of claim 1, wherein the fibrous material is a filter.

* * * * *